United States Patent [19]

Naylor

[11] 4,020,008

[45] Apr. 26, 1977

[54] CATALYSTS FOR PRODUCING HIGH TRANS-POLYBUTADIENE

[75] Inventor: Floyd E. Naylor, Bartlesville, Okla.

[73] Assignee: Phillips Petroleum Company, Bartlesville, Okla.

[22] Filed: Sept. 4, 1975

[21] Appl. No.: 610,358

Related U.S. Application Data

[62] Division of Ser. No. 447,201, March 1, 1974, Pat. No. 3,926,933.

[52] U.S. Cl. .......................... 252/429 B; 526/335
[51] Int. Cl.$^2$ ........................................ C08F 4/60
[58] Field of Search ............................. 252/429 B

[56] References Cited

UNITED STATES PATENTS

| | | | |
|---|---|---|---|
| 3,050,513 | 8/1962 | Zelinski et al. | 526/142 |
| 3,196,143 | 7/1965 | Stewart et al. | 252/429 B X |
| 3,223,694 | 12/1965 | Farrar | 252/429 B X |

*Primary Examiner*—Patrick P. Garvin

[57] ABSTRACT

1,3-Butadiene is polymerized to produce a high trans-polybutadiene employing a three-component catalyst system comprising: (1) a reducing agent in an oxyether solution; (2) a titanium halide plus molecular iodine wherein the halide is chloride or bromide, or titanium tetraiodide; and (3) a thioether.

5 Claims, No Drawings

CATALYSTS FOR PRODUCING HIGH TRANS-POLYBUTADIENE

This application is a division of copending application Ser. No. 447,201, filed Mar. 1, 1974 and now U.S. Pat. No. 3,926,933.

BACKGROUND

The invention relates to a catalyst for producing high transpolybutadiene.

Polymerization of dienes, such as 1,3-butadiene, using catalysts chosen to produce either cis- or trans-polybutadiene has proven to be an important technique for controlling the properties of such polymers. In general, the higher the trans content of a polybutadiene, the more resinous it is. High trans-polybutadiene is an elastic, tough, crystalline, thermoplastic solid. It is characteristically resistant to attack by ozone and other chemical agents, such as strong acids and bases. High trans-polymers of butadiene are used typically, in fabricating insulation for electrical wires and cables, battery cases, and golf balls covers.

It is an object of the invention to produce polymers.

Another object of the invention is to produce polymers of 1,3-butadiene.

Another object of the invention is to produce high trans-polybutadiene.

Still another object of the invention is to provide a novel catalyst for the production of high trans-polybutadiene.

Other objects, aspects, and advantages of the invention will become apparent to those skilled in the art upon studying the specification and the appended claims.

SUMMARY

In accordance with the invention a high trans-polybutadiene is produced by polymerizing 1,3-butadiene in the presence of a novel catalyst comprising: (1) an oxyether solution of a reducing agent represented by the general formula $XMH_4$ wherein X is a metal selected from the group consisting of lithium, sodium, potassium, rubidium, and cesium, and M is an element selected from the group consisting of aluminum and boron; (2) a halide of titanium mixed with molecular iodine when the halide is chloride or bromide, or titanium tetraiodide; and (3) a thioether.

DETAILED DESCRIPTION OF THE INVENTION

The reducing agent employed in the catalyst system of the present invention is represented by the general formula $XMH_4$ wherein X is lithium, sodium, potassium, rubidium, or cesium, and M is aluminum or boron. Some examples of suitable reducing agents are lithium aluminum hydride, sodium borohydride, and potassium aluminum hydride.

The reducing agent is dissolved in an oxyether. Ethers suitable for preparing the solutions include dialkyl ethers such as diethyl ether, di-n-butyl ether, methyl ethyl ether, and methyl-n-amyl ether.

The titanium halide component of the catalyst system is a mixture of either titanium tetrachloride and molecular iodine or titanium tetrabromide and molecular iodine, or alternatively titanium tetraiodide can be used with or without the presence of molecular iodine.

The thioethers suitable for use in the invention are represented by the general formula $$R-S-R'$$

wherein R and R' are hydrocarbon radicals selected from the group consisting of alkyl and cycloalkyl radicals containing from about 1 to 12 carbon atoms, or, alternatively, R and R' are alkylene groups joined to the sulfur atom and to each other to form a saturated heterocyclic thioether containing from about 4 to 10 carbon atoms. Some examples of suitable thioethers include dimethyl sulfide, diethyl sulfide, methyl ethyl sulfide, tetrahydrothiophene, and dicyclohexyl sulfide. Mixtures of thioethers can also be used.

The catalyst composition, on a mole ratio basis, can vary widely. The mole ratio of thioether to reducing agent can vary in the range of from about 0.1:1 to 100:1, preferably from about 1:1 to 50:1. The mole ratio of reducing agent to titanium halide component can vary in the range of from about 1:1 to 6:1, preferably in the range of from about 1.5:1 to 5:1. The mole ratio of molecular iodine to titanium tetrachloride or titanium tetrabromide is in the range of from about 0.5:1 to 5:1, preferably in the range of from about 1:1 to 3:1.

Generally the reaction mixture contains a diluent. Diluents suitable for use in the process are hydrocarbons which are not detrimental to the polymerization process. Suitable diluents include paraffinic and cycloparaffinic hydrocarbons and mixtures thereof. Examples of such diluents include n-hexane, n-heptane, 2,2,4-trimethylpentane, and cyclohexane.

The polymerization temperature can vary widely, but usually it is in the range of from about 0° to 100° C, preferably from about 30° to 80° C. Also the polymerization pressure varies widely. The polymerization reaction can be carried out under autogenous pressure or at any suitable pressure sufficient to maintain the reaction mixture substantially in the liquid phase. Generally the pressure will thus depend upon the particular diluent being employed and the temperature at which the polymerization is carried out. However, higher pressures can be employed if desired by using a suitable method such as the pressurization of the reactor with a gas which is inert with respect to the polymerization reaction.

Various materials are known to be detrimental to the catalyst of this invention. These materials include carbon dioxide, oxygen and water. It is usually desirable, therefore, that the reactants and catalysts be freed of these materials as well as other materials which may tend to inactivate the catalyst. Furthermore, it is desirable to remove air and moisture from the reaction vessel in which the polymerization is to be conducted. Upon completion of the polymerization, the polymerization mixture is then treated to inactivate the catalyst and to recover the polymer. A suitable method for accomplishing this result involves steam stripping the diluent from the polymer. In another suitable method a catalyst-inactivating material, such as an alcohol, is added to the mixture so as to inactivate the catalyst and cause precipitation of the polymer. The polymer is then separated from the alcohol and diluent by any suitable means, such as decantation or filtration. It has been found to be advantageous to add an antioxidant, such as 2,6-di-t-butyl-4-methylphenol to the polymer solution prior to recovery of the polymer.

ILLUSTRATIVE EXAMPLES

The polymerizations were carried out under nitrogen in capped beverage bottles employing anhydrous reactants and conditions. The bottles were tumbled in a constant temperature bath for the stipulated polymerization times and at the stipulated temperatures. Following polymerization, 2,6-di-t-butyl-4-methylphenol (1 part by weight per hundred parts of monomer) was added in a 50/50 volume toluene/isopropyl alcohol solution, the polymer solutions were filtered, and the polymers were coagulated by adding the filtrates to isopropyl alcohol. The polymers were then collected by filtration and dried at reduced pressure. Polymers thus produced were thermoplastic in character.

Shown immediately below are definitions of abbreviations and terms employed in the following working examples. Also included are descriptions and references for analytical and evaluation methods employed.

m.p. Melting point, °C f.p. Freezing point, °C m.h.m Gram millimoles per hundred grams monomer p.h.m. Parts by weight per 100 parts by weight monomer
  a. Inherent Viscosity (Inh. Visc.) was determined using tetrahydrofuran instead of toluene by the process shown in U.S. Pat. No. 3,278,508, column 20, note a, with the further modification that the solution was not filtered through a sulfur absorption tube, but rather a sample of the solution was filtered through a fritted glass filter stick of grade C porosity and pressured directly into the viscometer.
  b. Differential Thermal Analysis (DTA) melting points and freezing points were determined on DuPont instrument DTA-900 differential thermal analyzer employing a differential scanning calorimeter cell. The point of maximum deflection of the endotherm or exotherm under a nitrogen atmosphere was observed. Heating and cooling rates employed were each 10° per minute. Samples were of approximately 15 mg.
  c. Polymer microstructure, i.e., trans and vinyl contents were determined by infrared absorption spectroscopy.

EXAMPLES 1–14

A series of examples was made in accordance with the following recipe. The results are shown below. A dash in the table below and the tables that follow indicates no value was determined.

Recipe

| | p.h.m. |
|---|---|
| Butadiene | 100 |
| n-Hexane | 660 |
| Diethyl Ether | variable |
| Dimethyl sulfide | variable |
| Tetrahydrothiophene | variable |
| Lithium aluminum hydride (0.4M in diethyl ether) | 1.8 mhm |
| Titanium tetrachloride | .72 mhm |
| Iodine | 1.4 mhm |
| | |
| Temperature, °C | 50 |
| Time, hours | 5 |
| Charge Order: | Hexane, N$_2$purge, thioether, LiAlH$_4$ in diethyl ether solution, TiCl$_4$, I$_2$, butadiene |

| Ex. No. | Diethyl Ether Parts. | Diethyl Ether mhm | Dimethyl Sulfide mhm | Tetrahydro-thiophene mhm | Conv. Wt. % | Trans Wt. % | Vinyl Wt. % | Inh. Visc. |
|---|---|---|---|---|---|---|---|---|
| 1 | 2.5 | 33.8 | 0 | 0 | 65 | 83.6 | 2.7 | 2.16 |
| 2 | 5.0 | 67.6 | 0 | 0 | 55 | — | — | — |
| 3 | 7.5 | 101.4 | 0 | 0 | 50 | — | — | — |
| 4 | 10.0 | 135.2 | 0 | 0 | 40 | 92.0 | 2.3 | 1.29 |
| 5 | 2.5 | 33.8 | 2 | 0 | 80 | 87.0 | 2.6 | 1.60 |
| 6 | 2.5 | 33.8 | 4 | 0 | 80 | 91.0 | 2.4 | 1.30 |
| 7 | 2.5 | 33.8 | 6 | 0 | 65 | — | — | — |
| 8 | 2.5 | 33.8 | 8 | 0 | 75 | 94.2 | 2.7 | 0.90 |
| 9 | 2.5 | 33.8 | 0 | 2 | 65 | 89.8 | 2.8 | 1.53 |
| 10 | 2.5 | 33.8 | 0 | 4 | 75 | 91.3 | 2.2 | 1.41 |
| 11 | 2.5 | 33.8 | 0 | 6 | 75 | — | — | — |
| 12 | 2.5 | 33.8 | 0 | 8 | 75 | 94.3 | 2.6 | 0.71 |
| 13* | 2.5 | 33.8 | 0 | 0 | 95 | 83.0 | 2.5 | 2.59 |
| 14* | 2.5 | 33.8 | 60 | 0 | 40 | 95.2 | 3.3 | 0.74 |

*These examples were allowed to proceed for a 68-hour polymerization period and in Example 14 the thioether-LiAlH$_4$ charge order shown above was reversed.

Example I, employing no thioether and only that amount of diethyl ether required as solvent for the lithium aluminum hydride employed, constituted a control run which indicated the trans level obtained by the use of that amount of ether which was introduced simply as the solvent for the lithium aluminum hydride. The trend in conversion values for experiments 1–3 showed the marked depressive effect on conversion by increasing quantities of diethyl ether. Example 4, employing no thioether but employing a radically high amount of diethyl ether, indicated a good trans value (92 percent), but at the cost of suppressing conversion to only 40 percent. This example showed that increasing the diethyl ether level will ultimately produce high trans values, but at the expense of providing very low polymer yields. Example 8 indicated a good trans value coupled with a good conversion by employing an amount of thioether that was modest in comparison to the amount of diethyl ether present as the solvent for the lithium aluminum hydride. Note, the same quantity of oxyether (diethyl ether) was present in Example 8 as was employed in Example 1 above. Example 12, illustrating the use of a cyclic thioether, tetrahydrothiophene, provided a result effectively identical to that in Example 8. It is important to note in these examples that the use of thioethers made it possible to obtain high trans values without incurring substantial suppression of monomer conversion. It is also noted Example 13 involves a longer reaction time than Example 1 and, hence, a superior yield. Example 14 reflected the use of an excessive amount of thioether which produced a very good trans value but a low monomer conversion.

This example is not intended as a good illustration of the invention, but simply indicates the result of employing excessive amounts of thioether.

EXAMPLE 15

A sample of very high trans-polybutadiene was prepared in accordance with the following recipe.

Recipe

|  | p.h.m. |
|---|---|
| Butadiene | 100 |
| n-Hexane | 660 |
| Dimethyl sulfide | 16 mhm |
| Lithium aluminum hydride (0.55M in diethyl ether) | 1.0 mhm |
| Titanium tetrachloride | 0.5 mhm |
| Iodine | 1.0 mhm |
| Temperature, °C | 50 |
| Time, hours | 6 |
| Charge Orders: | n-Hexane, N$_2$ purge, CH$_3$SCH$_3$, LiAlH$_4$ solution, I$_2$, butadiene |

After polymerization, 1 part 2,6-di-tert-butyl-4-methylphenol by weight per 100 parts by weight polymer was added to the polymer. Conversion was 70 percent.

| Percent trans (by infrared) | 97.4 |
|---|---|
| Percent vinyl (by infrared) | 3.2 |
| Inherent viscosity | 1.22 |
| DTA, m.p. | 114° C |
| DTA, f.p. | 87° C |

This example produced a polymer with an excellent trans value and a good conversion.

EXAMPLES 16–30

In accordance with the following recipe, a series of examples was made employing lithium aluminum hydride in an oxyether solution, titanium tetrachloride, and molecular iodine with diethyl sulfide as the thioether. Various titanium tetrachloride and molecular iodine levels were employed.

Recipe

|  | p.h.m. |
|---|---|
| Butadiene | 100 |
| n-Hexane | 660 |
| Diethyl sulfide | variable |
| Lithium aluminum hydride (0.41M in diethyl ether) | 1.3 mhm |
| Titanium tetrachloride | variable |
| Iodine | variable |
| Temperature, °C | 70 |
| Time, hours | 4 |
| Charge Order: | n-Hexane, N$_2$ purge, LiAlH$_4$ solution, (C$_2$H$_5$)$_2$S, TiCl$_4$, I$_2$, butadiene |

| Ex. No. | TiCl$_4$ mhm | Iodine mhm | (C$_2$H$_5$)$_2$S mhm | Conv., Wt. % | Trans Wt. % | Vinyl Wt. % | Inh. Visc. | DTA m.p. | DTA f.p. |
|---|---|---|---|---|---|---|---|---|---|
| 16 | 0.867 | 1.73 | 0 | 80 | 83.4 | 2.7 | 4.12 | — | — |
| 17 | 0.867 | 1.73 | 2 | 81 | 85.9 | 2.6 | 2.73 | — | — |
| 18 | 0.867 | 1.73 | 4 | 79 | 88.9 | 2.6 | 3.91 | — | — |
| 19 | 0.867 | 1.73 | 6 | 54 | — | — | — | — | — |
| 20 | 0.867 | 1.73 | 8 | 78 | 87.2 | 2.5 | 2.24 | — | — |
| 21 | 0.65 | 1.62 | 0 | 81 | — | — | — | — | — |
| 22 | 0.65 | 1.62 | 2 | 81 | — | — | — | — | — |
| 23 | 0.65 | 1.62 | 4 | 84 | — | — | — | — | — |
| 24 | 0.65 | 1.62 | 6 | 76 | — | — | — | — | — |
| 25 | 0.65 | 1.62 | 8 | 77 | 88.4 | 2.4 | 3.52 | — | — |
| 26 | 0.65 | 1.3 | 0 | 82 | — | — | — | 45 | 37 |
| 27 | 0.65 | 1.3 | 2 | 85 | — | — | — | — | — |
| 28 | 0.65 | 1.3 | 4 | 85 | — | — | — | — | — |
| 29 | 0.65 | 1.3 | 6 | 85 | — | — | — | — | — |
| 30 | 0.65 | 1.3 | 8 | 81 | 86.5 | 2.6 | 2.81 | 82 | 43 |

Examples 16–30 demonstrated that a wide variety of titanium tetrachloride and molecular iodine levels can be employed.

EXAMPLES 31–37

In accordance with the following recipe, several runs were made employing lithium aluminum hydride in an oxyether solution, titanium tetraiodide, and a thioether (dimethyl sulfide).

Recipe

|  | p.h.m. |
|---|---|
| Butadiene | 100 |
| n-Hexane | 660 |
| Dimethyl sulfide | variable |
| Titanium tetraiodide | variable |
| Lithium aluminum hydride (0.45M in diethyl ether) | 1.8 mhm |
| Temperature, °C | 70 |
| Time, hours | 3 |
| Charge Order: n-Hexane, TiI$_4$, LiAlH$_4$, (CH$_3$)$_2$S, butadiene |

| Ex. No. | Et$_2$O Parts | Me$_2$S mhm | TiI$_4$ mhm | Conv. Wt. % | Trans Wt. % | Vinyl Wt. % | Inh. Visc. |
|---|---|---|---|---|---|---|---|
| 31 | 2.5 | 0 | 1.2 | Trace | — | — | — |
| 32 | 10 | 0 | 1.2 | Trace | — | — | — |
| 33 | 2.5 | 2.0 | 1.2 | Trace | — | — | — |
| 34 | 2.5 | 8.0 | 1.2 | 7 | — | — | — |
| 35 | 2.5 | 5.0 | 2.0 | 32 | 44.8 | 30.7 | 0.99 |
| 36 | 2.5 | 8.0 | 2.0 | 43 | 51.8 | 28.0 | 1.28 |
| 37 | 2.5 | 12.0 | 2.0 | 63 | 66.9 | 17.4 | 1.74 |

It is probable that proportionally low titanium tetraiodide levels were responsible for the poor results in Examples 31–34. Runs 35–37 exhibited the expected increase in trans content accompanying an increase in thioether level.

EXAMPLES 38–43

Examples 38–43 illustrated the use of lithium aluminum hydride in a oyether solution, titanium tetrachloride, molecular iodine, and diphenyl sulfide. These runs were made in accordance with the following recipe.

Recipe

| | p.h.m. |
|---|---|
| Butadiene | 100 |
| n-Hexane | 660 |
| Diphenyl sulfide | variable |
| Lithium aluminum hydride (.45M in diethyl ether) | 1.3 mhm |
| Titanium tetrachloride | 0.65 mhm |
| Iodine | 1.3 mhm |
| Temperature, °C | 50 |
| Time, hours | 20 |
| Charge Order: | n-Hexane, N₂ purge, φ₂S, LiAlH₄ solution, TiCl₄, I₂, butadiene; shortstopped with isopropyl alcohol-toluene containing 1 phr 2,6-di-t-butyl-4-methylphenol; and coagulated with isopropyl alcohol |

| Ex. No. | φ₂S mhm | Conv. Wt. % | Trans Wt. % | Vinyl Wt. % | Inh. Visc. |
|---|---|---|---|---|---|
| 38 | 0 | 78 | 83.7 | 2.5 | 2.97 |
| 39 | 1 | 54 | — | — | — |
| 40 | 2 | 30 | — | — | — |
| 41 | 4 | 53 | 77.6 | 2.7 | 2.88 |
| 42 | 8 | 10 | — | — | — |
| 43 | 16 | 2 | — | — | — |

The above data indicated that the use of diphenyl sulfide appeared to not only suppress conversion of monomer, but also to suppress the trans content of the polymers.

EXAMPLES 44–55

A series of runs was made employing variable amounts of tetrahydrothiophene as the thioether, and also employing varying amounts of titanium tetrachloride. Neither molecular iodine nor titanium tetraiodide was employed.

Recipe

| | p.h.m. |
|---|---|
| Butadiene | 100 |
| n-Hexane | 660 |
| Tetrahydrothiophene | variable |
| Lithium aluminum hydride (0.36M in diethyl ether) | 2.0 mhm |
| Titanium tetrachloride | variable |
| Temperature, °C | 50 |
| Time, hours | 24 |
| Charge Order: | n-Hexane, N₂ purge, tetrahydrothiophene, LiAlH₄ solution, TiCl₄, butadiene, 50C polymerization |

| Ex. No. | TiCl₄ mhm |  mhm | Conv. Wt. % | Trans Wt. % | Vinyl Wt. % | Inh. Visc. |
|---|---|---|---|---|---|---|
| 44 | 0.5 | 0 | 2 | — | — | — |
| 45 | 0.5 | 1 | 6 | — | — | — |
| 46 | 0.5 | 5 | 11 | — | — | — |
| 47 | 0.5 | 10 | 36 | 8.7 | 62.8 | 1.09 |
| 48 | 1.0 | 0 | 3 | 46.1 | 38.4 | — |
| 49 | 1.0 | 1 | 14 | — | — | — |
| 50 | 1.0 | 5 | 27 | — | — | — |
| 51 | 1.0 | 10 | 32 | 10.4 | 60.8 | 0.77 |
| 52 | 2.0 | 0 | 0 | — | — | — |
| 53 | 2.0 | 1 | 0 | — | — | — |
| 54 | 2.0 | 5 | 0 | — | — | — |
| 55 | 2.0 | 10 | trace | — | — | — |

The absence of molecular iodine apparently caused poor conversion and poor trans values under conditions employed. The absence of significant conversion in Examples 52–55 is ascribed to the presence of excessive amounts of titanium tetrachloride in proportion to the amount of lithium aluminum hydride present.

What is claimed is:

1. A catalyst useful for the production of high trans-polybutadiene consisting essentially of:
   a. an oxyether solution of a reducing agent represented by the general formula XMH₄, wherein X is a metal selected from the group consisting of lithium, sodium, potassium, rubidium, and cesium, and M is Al;
   b. a titanium halide component selected from the group consisting of titanium tetrachloride plus molecular iodine, titanium tetrabromide plus molecular iodine, and titanium tetraiodide; and
   c. at least one thioether represented by the general formula

R—S—R' wherein R and R' are hydrocarbon radicals selected from the group consisting of alkyl and cycloalkyl radicals containing from about 1 to 12 carbon atoms, or R and R' are hydrocarbon radicals selected from the group consisting of alkylene groups joined to the sulfur atom and to each other to form a saturated heterocyclic thioether containing from about 4 to 10 carbon atoms.

2. The catalyst of claim 1 wherein the mole ratio of thioether to reducing agent is in the range of from about 0.1:1 to 100:1; wherein the mole ratio of reducing agent to the titanium halide component is in the range of from about 1:1 to 6:1; and wherein the mole ratio of molecular iodine to titanium tetrachloride and titanium tetrabromide is in the range of from about 0.5:1 to 5:1.

3. The catalyst of claim 1 wherein the mole ratio of thioether to reducing agent is in the range of from about 1:1 to 50:1; wherein the mole ratio of reducing agent to the titanium halide component is in the range of from about 1.5:1 to 5:1; and wherein the mole ratio of molecular iodine to titanium tetrachloride and titanium tetrabromide is in the range of from about 1:1 to 3:1.

4. The catalyst of claim 1 wherein the oxyether solution of a reducing agent is lithium aluminum hydride in a diethyl ether solution, the titanium halide component is titanium tetrachloride plus molecular iodine, and the thioether is dimethyl sulfide.

5. The catalyst of claim 4 wherein the thioether is tetrahydrothiophene.

* * * * *